United States Patent
Zaima et al.

(10) Patent No.: US 11,004,604 B2
(45) Date of Patent: May 11, 2021

(54) CERAMIC ELECTRONIC DEVICE WITH INFLECTED EXTERNAL ELECTRODES AND MANUFACTURING METHOD OF CERAMIC ELECTRONIC DEVICE WITH REVERSE PATTERN SLURRY

(71) Applicant: TAIYO YUDEN CO., LTD., Tokyo (JP)

(72) Inventors: Tomohiko Zaima, Takasaki (JP); Takashi Sasaki, Takasaki (JP); Kunihiro Matsushita, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 22 days.

(21) Appl. No.: 16/427,249

(22) Filed: May 30, 2019

(65) Prior Publication Data
US 2019/0371525 A1  Dec. 5, 2019

(30) Foreign Application Priority Data

Jun. 5, 2018  (JP) .............................. JP2018-107425

(51) Int. Cl.
*H01G 4/012*  (2006.01)
*H01G 4/232*  (2006.01)
*H01G 4/30*  (2006.01)

(52) U.S. Cl.
CPC ............. *H01G 4/012* (2013.01); *H01G 4/232* (2013.01); *H01G 4/30* (2013.01)

(58) Field of Classification Search
None
See application file for complete search history.

(56) References Cited

U.S. PATENT DOCUMENTS

| 4,356,529 A | * | 10/1982 | Kopel | H01G 4/232 361/303 |
| 4,845,452 A | * | 7/1989 | Sasaki | H05K 3/3442 336/200 |
| 5,712,758 A | * | 1/1998 | Amano | H01G 4/2325 361/306.3 |
| 6,445,593 B1 | * | 9/2002 | Okuyama | H01F 17/0013 257/421 |

(Continued)

FOREIGN PATENT DOCUMENTS

JP  2014027077 A  2/2014

*Primary Examiner* — Binh B Tran
*Assistant Examiner* — Muhammed Azam
(74) *Attorney, Agent, or Firm* — Law Office of Katsuhiro Arai

(57) ABSTRACT

A ceramic electronic device includes: a multilayer chip in which dielectric layers are stacked, the multilayer chip having two end faces, an upper face, a lower face and two side faces; a plurality of first internal electrode layers that are provided inside of the multilayer chip, each of the plurality of first internal electrode layers having projection portions extracted to the two side faces; and external electrodes that are provided on the two side faces between the two end faces and are connected to the projection portions, wherein each of the external electrodes has a smaller thickness in a region not connected to the projection portions, has an inflection point toward the projection portions, and has a larger thickness in a region connected to the projection portions, in a direction connecting the two end faces.

9 Claims, 12 Drawing Sheets

(56) References Cited

U.S. PATENT DOCUMENTS

| | | | | |
|---|---|---|---|---|
| 8,599,532 B2* | 12/2013 | Sakuratani | H01G 4/30 | 361/306.3 |
| 8,654,504 B2* | 2/2014 | Sakuratani | H01C 7/18 | 361/306.3 |
| 8,665,053 B2* | 3/2014 | Ogawa | H01G 4/30 | 336/200 |
| 9,060,461 B2* | 6/2015 | Sawada | H01G 2/06 | |
| 9,087,643 B1* | 7/2015 | Nishibayashi | H01G 4/005 | |
| 9,287,048 B2* | 3/2016 | Sawada | H01G 4/12 | |
| 9,374,908 B2* | 6/2016 | Fujii | H01G 4/012 | |
| 9,390,852 B2* | 7/2016 | Lee | H01G 4/232 | |
| 9,460,856 B2* | 10/2016 | Park | H01G 4/232 | |
| 10,325,722 B2* | 6/2019 | Park | H01G 4/248 | |
| 2001/0013602 A1* | 8/2001 | Nakagawa | H01G 13/006 | 257/4 |
| 2002/0101702 A1* | 8/2002 | Makl, Jr. | H01G 4/232 | 361/306.3 |
| 2003/0011962 A1* | 1/2003 | Yamamoto | H01G 4/30 | 361/321.2 |
| 2004/0226647 A1* | 11/2004 | Ito | H04B 35/645 | 156/89.11 |
| 2010/0157506 A1* | 6/2010 | Togashi | H01G 4/232 | 361/303 |
| 2011/0205684 A1* | 8/2011 | Yamamoto | H01G 4/35 | 361/305 |
| 2012/0018204 A1* | 1/2012 | Sato | H01G 4/232 | 174/260 |
| 2012/0120546 A1* | 5/2012 | Togashi | H01G 4/30 | 361/302 |
| 2012/0188684 A1* | 7/2012 | Akazawa | H01G 4/005 | 361/321.2 |
| 2012/0319537 A1* | 12/2012 | Sakuratani | H01L 41/273 | 310/366 |
| 2012/0320495 A1* | 12/2012 | Akazawa | H01G 4/30 | 361/321.2 |
| 2013/0038419 A1* | 2/2013 | Kobayashi | H01F 1/24 | 336/200 |
| 2014/0029159 A1 | 1/2014 | Shimada et al. | | |
| 2014/0211367 A1* | 7/2014 | Morita | H01G 4/1209 | 361/301.4 |
| 2015/0084487 A1* | 3/2015 | Mori | H01L 41/0472 | 310/364 |
| 2016/0049243 A1* | 2/2016 | Uno | H01G 4/30 | 361/303 |
| 2016/0049249 A1* | 2/2016 | Mukobata | H01G 4/012 | 361/301.4 |
| 2016/0049253 A1* | 2/2016 | Mukobata | H01G 4/232 | 361/301.4 |
| 2016/0189867 A1* | 6/2016 | Zaima | H01G 4/232 | 361/301.4 |
| 2017/0032897 A1* | 2/2017 | Sasaki | H01G 4/0085 | |
| 2017/0345566 A1* | 11/2017 | Tanaka | H01G 4/1209 | |
| 2018/0182552 A1* | 6/2018 | Sawada | H01G 4/12 | |
| 2019/0148070 A1* | 5/2019 | Kobayashi | H05K 3/3442 | 174/260 |

* cited by examiner

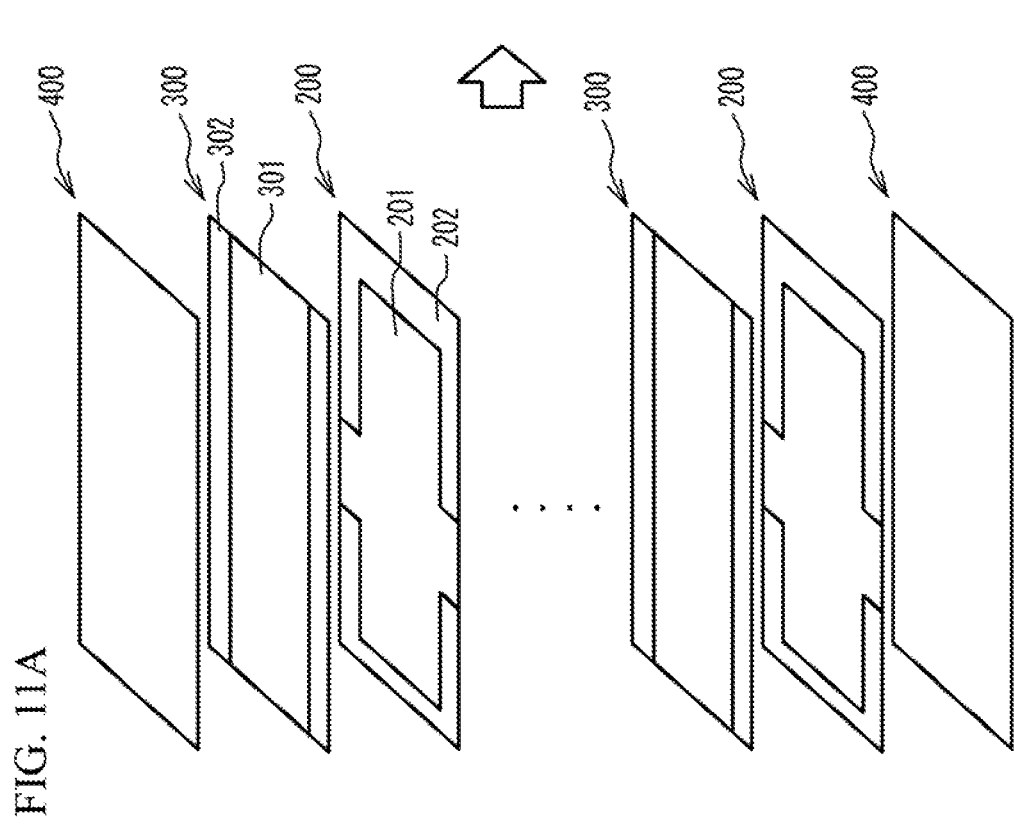

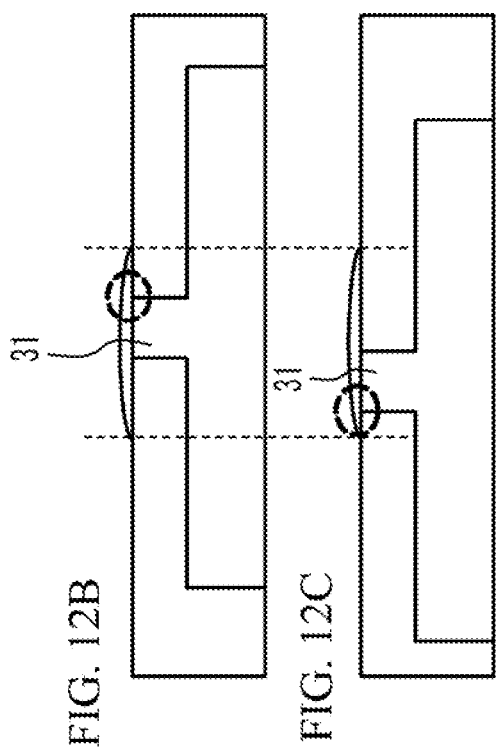
FIG. 12B
FIG. 12C
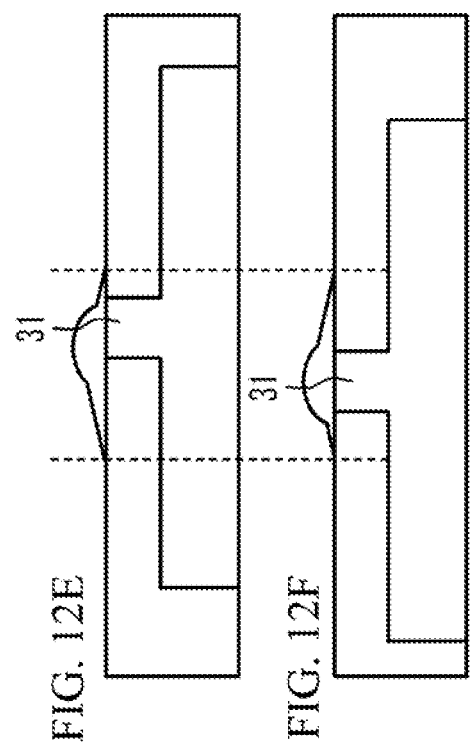
FIG. 12E
FIG. 12F
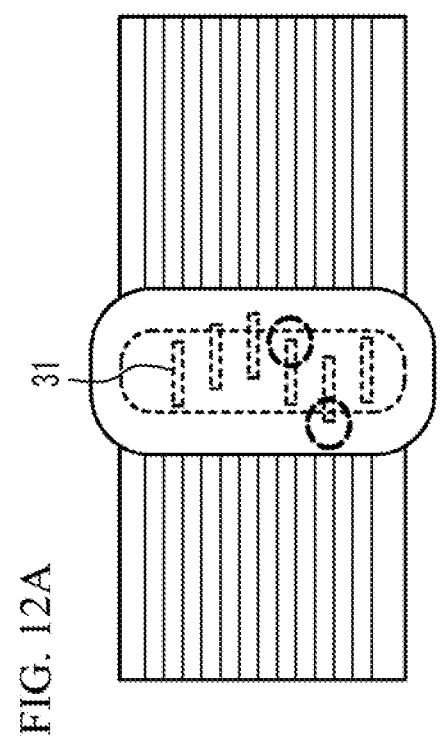
FIG. 12A
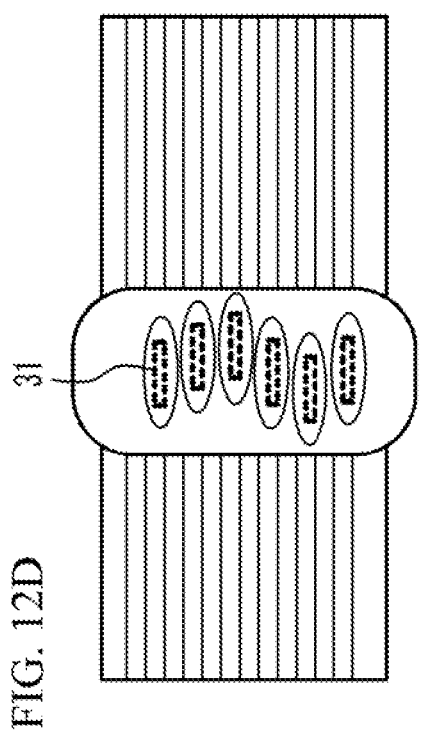
FIG. 12D

CERAMIC ELECTRONIC DEVICE WITH INFLECTED EXTERNAL ELECTRODES AND MANUFACTURING METHOD OF CERAMIC ELECTRONIC DEVICE WITH REVERSE PATTERN SLURRY

CROSS-REFERENCE TO RELATED APPLICATION

This application is based upon and claims the benefit of priority of the prior Japanese Patent Application No. 2018-107425, filed on Jun. 5, 2018, the entire contents of which are incorporated herein by reference.

FIELD

A certain aspect of the present invention relates to a ceramic electronic device and a manufacturing method of the ceramic electronic device.

BACKGROUND

Downsizing of components are requested, with respect to small size mobile phones or the like. For example, ceramic electronic devices such as three-terminal multilayer ceramic capacitors have low ESL characteristic. Therefore, the three-terminal multilayer ceramic capacitors achieve desirable characteristic with small number of elements. Accordingly, ceramic electronic devices such as three-terminal multilayer ceramic capacitors (for example, see Japanese Patent Application Publication No. 2014-27077) can achieve space-saving.

SUMMARY OF THE INVENTION

The present invention has a purpose of providing a ceramic electronic device and a manufacturing method of the ceramic electronic device that are capable of securing humidity resistance and suppressing external size.

According to an aspect of the present invention, there is provided a ceramic electronic device including: a multilayer chip in which dielectric layers of which a main component is ceramic are stacked, the multilayer chip having a rectangular parallelepiped shape and having two end faces facing with each other, an upper face and a lower face in a stacking direction of the dielectric layers, and two side faces that are other than the two end faces, the upper face and the lower face; a plurality of first internal electrode layers that are provided inside of the multilayer chip, each of the plurality of first internal electrode layers having projection portions extending to the two side faces; and external electrodes that are provided on the two side faces between the two end faces and are connected to the projection portions, wherein each of the external electrodes has a smaller thickness in a region not connected to the projection portions, has an inflection point toward the projection portions, and has a larger thickness in a region connected to the projection portions, in a direction connecting the two end faces.

According to another aspect of the present invention, there is provided a manufacturing method including: preparing a ceramic multilayer structure in which a plurality of pattern-formed sheets are stacked, the plurality of pattern-formed sheets having conductive paste for an internal electrode printed on a dielectric green sheet including ceramic and having a rectangular shape so as to be exposed to a part of two long sides of dielectric green sheet, and reverse pattern slurry that is printed so as to have a reverse pattern with respect to the conductive paste for an internal electrode and include ceramic, the ceramic multilayer structure having a rectangular parallelepiped shape; coating conductive paste for an external electrode so as to continuously cover the plurality of the conductive pastes for an internal electrode that are exposed to two side faces of the ceramic multilayer structure, the two side faces being other than two end faces, an upper face and a lower face of the ceramic multilayer structure, the upper face and the lower face being an upper face and a lower face in a stacking direction of the pattern-formed sheets; and firing the ceramic multilayer structure and the conductive paste for an external electrode, wherein wettability of the conductive paste for an external electrode with respect to the reverse pattern slurry is higher than wettability of the conductive paste for an external electrode with respect to the conductive paste for an internal electrode, on the two side faces, before the firing process.

BRIEF DESCRIPTION OF THE DRAWINGS

FIG. 11A illustrates a multilayer structure of a first-pattern-formed sheet, a second-pattern-formed sheet and a cover sheet;

FIG. 11B illustrates a positional shift of projection portions; and

FIG. 12A to FIG. 12F illustrate a case where conductive paste for an external electrode is coated on a region corresponding to an external electrode 20*c*.

DETAILED DESCRIPTION

Downsizing and capacity enlargement are requested, with respect to the ceramic electronic devices such as three-terminal multilayer ceramic capacitors. However, it is difficult to enlarge a capacity region or increase the number of stacking. And so, it is thought that the capacity region is enlarged with use of an excess portion of an external size and the number of stacking is increased, by reducing the thickness of external electrodes. However, when the thickness of the external electrodes is reduced, humidity resistance may be degraded.

A description will be given of an embodiment with reference to the accompanying drawings.

Figure 1:
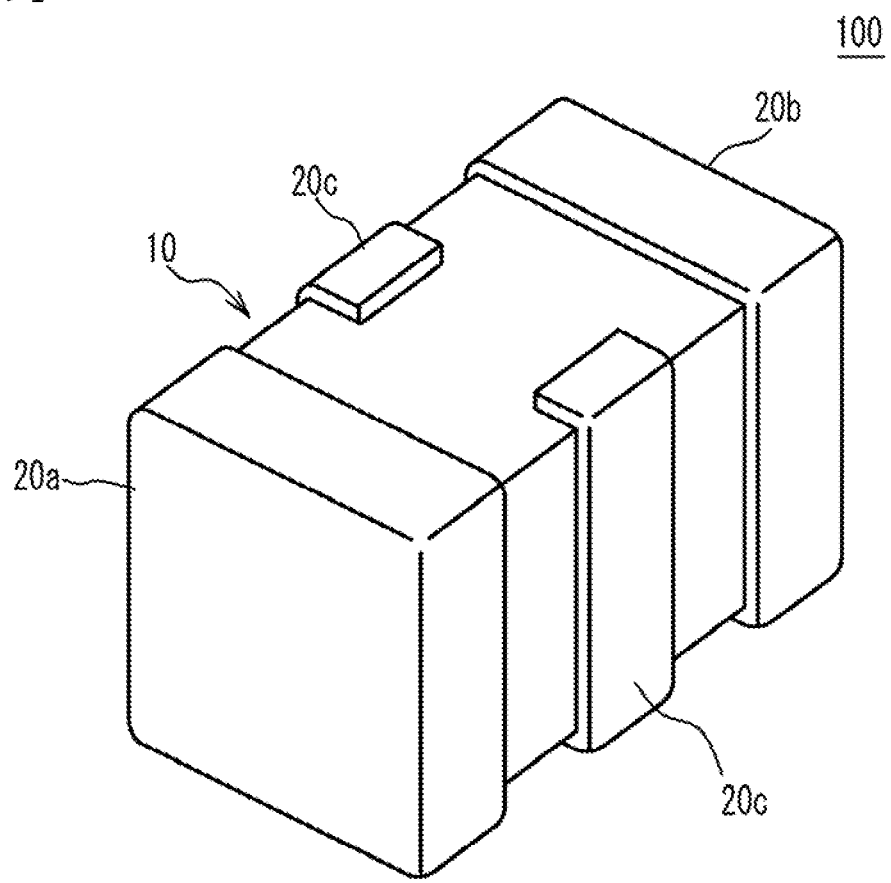
FIG. 1 illustrates a partial perspective view of a multilayer ceramic capacitor.

(Embodiment) A description will be given of an outline of a multilayer ceramic capacitor as an example of ceramic electronic devices. FIG. 1 illustrates a partial perspective view of a multilayer ceramic capacitor 100. As illustrated in FIG. 1, the multilayer ceramic capacitor 100 includes a multilayer chip 10 having a rectangular parallelepiped shape. The multilayer chip 10 has two end faces facing with each other. Two faces facing each other in a stacking direction are referred to as an upper face and a lower face. In the multilayer chip 10, two faces other than the two end faces, the upper face and the lower face are referred to as side faces. An external electrode 20a is provided on one of the two end faces of the multilayer chip 10. An external electrode 20b is provided on the other of the two end faces. The external electrodes 20a and 20b extend to the upper face, the lower face and the two side faces of the multilayer chip 10. However, the external electrodes 20a and 20b are spaced from each other. An external electrode 20c is provided from the lower face to the upper face via one of the side faces of the multilayer chip 10, between the external electrode 20a and the external electrode 20b. Another external electrode 20c is provided from the lower face to the upper face via the other of the side faces of the multilayer chip 10, between the external electrode 20a and the external electrode 20b. The external electrodes 20c are spaced from the external electrode 20a and the external electrode 20b. And, the external electrodes 20c are spaced from each other.

Figure 2:
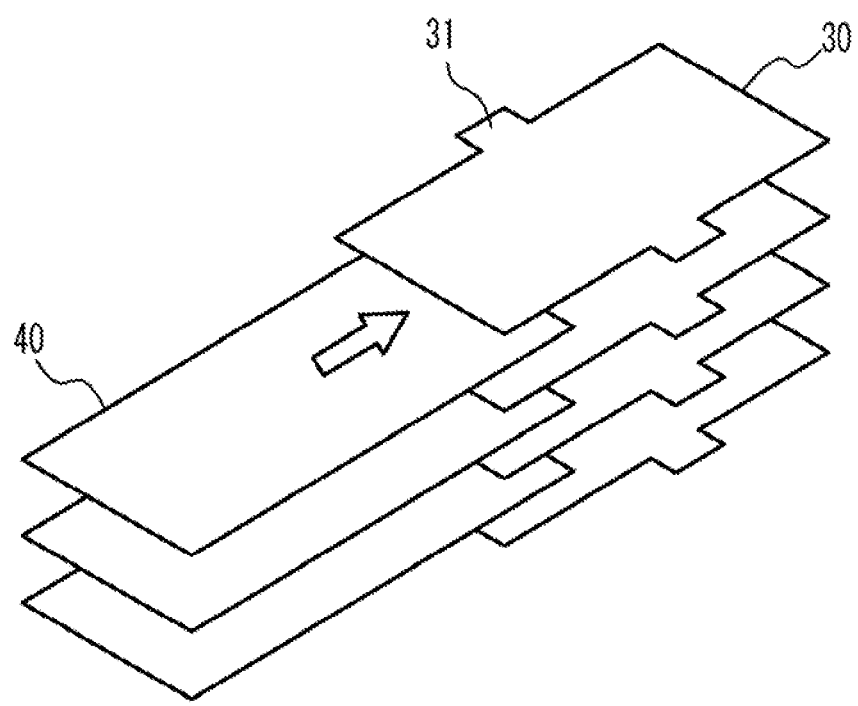
FIG. 2 illustrates a multilayer structure of internal electrode layers in a multilayer chip.

FIG. 2 illustrates a multilayer structure of internal electrode layers in the multilayer chip 10. As illustrated in FIG. 2, in the multilayer chip 10, each of first internal electrode layers 30 and each of second internal electrode layers 40 are alternately stacked. The first internal electrode layer 30 has a rectangular shape, in a planar view. The first internal electrode layer 30 respectively has a projection portions 31 in a center portion of two long sides. Therefore, the first internal electrode layer 30 substantially has a cross shape, in a planar view. The second internal electrode layer 40 has a rectangular shape, in a planar view. Long sides of the second internal electrode layer 40 are longer the long sides of the first internal electrode layer 30.

Figure 3A:
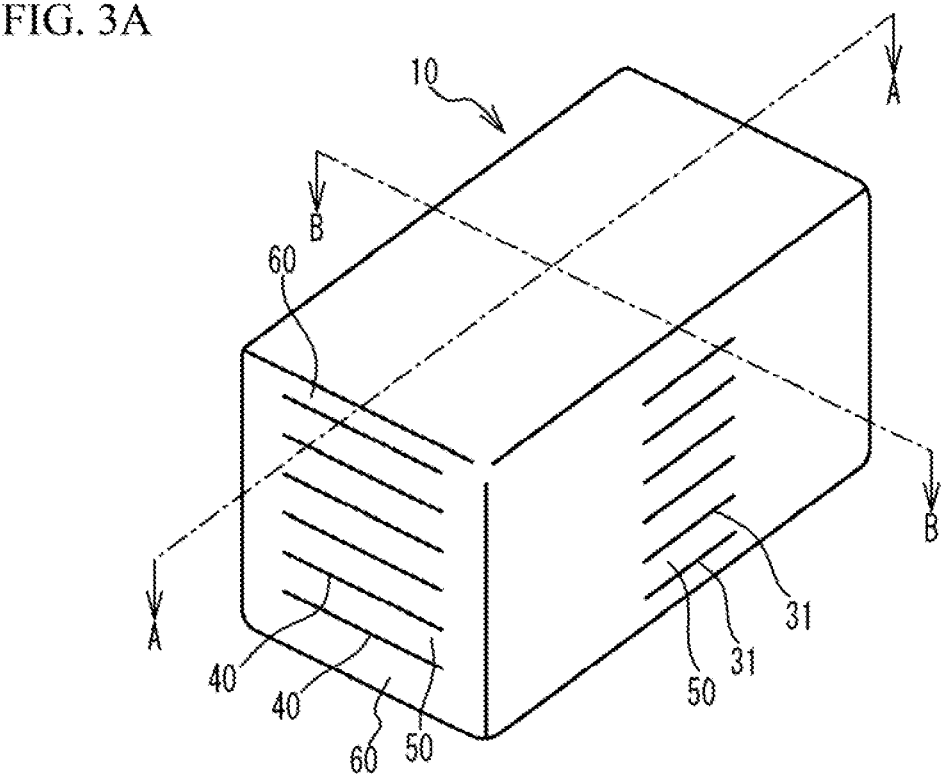
FIG. 3A and FIG. 3B illustrate a perspective view of a multilayer chip in which external electrodes are permeated.

FIG. 3A illustrates a perspective view of the multilayer chip 10. In FIG. 3A, the external electrodes 20a to 20c are permeated. As illustrated in FIG. 3A, the second internal electrode layers 40 are exposed to the two end faces of the multilayer chip 10. The second internal electrode layers 40 are connected to both the external electrode 20a and the external electrode 20b. The first internal electrode layer 30 is not exposed to the two end faces of the multilayer chip 10. Therefore, the first internal electrode layer 30 is not connected to the external electrode 20a or 20b. The projection portions 31 of the first internal electrode layer 30 are exposed to the two side faces of the multilayer chip 10. The projection portions 31 are connected to the external electrode 20c at the two side faces. The second internal electrode layer 40 is not exposed to the two side faces. Therefore, the second internal electrode layer 40 is not connected to the external electrode 20c.

A dielectric layer 50 is provided between the first internal electrode layer 30 and the second internal electrode layer 40. In the multilayer chip 10, the cover layers 60 cover an upper face and a lower face in a stacking direction of a multilayer structure in which the first internal electrode layer 30, the second internal electrode layer 40 and the dielectric layer 50 are stacked.

Figure 3B:
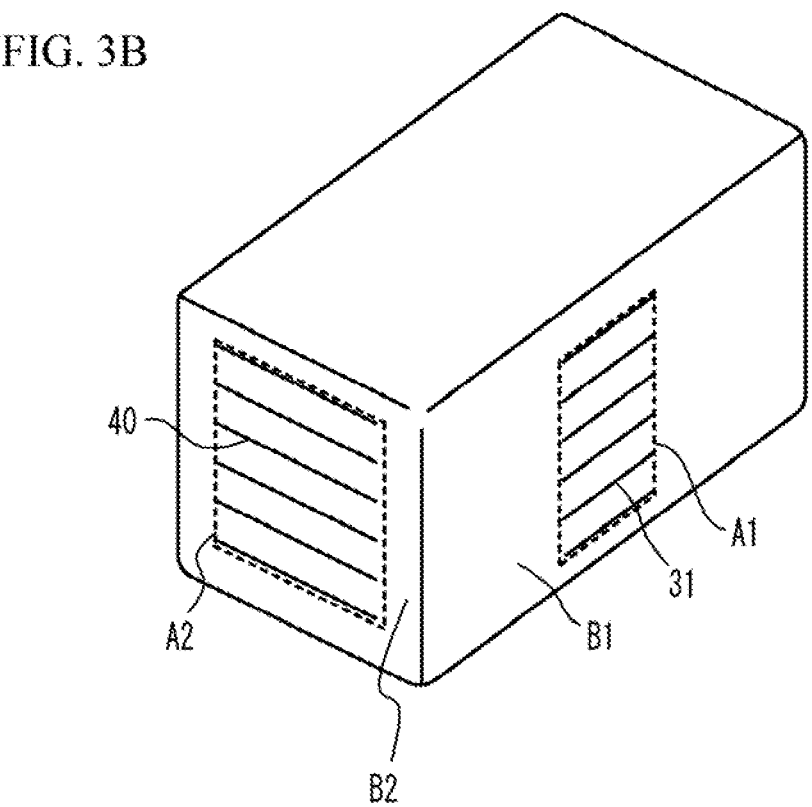

As illustrated in FIG. 3B, in the two side faces of the multilayer chip 10, a region covering a region to which the projection portions 31 are extracted is referred to as a first extraction region A1. In the two side faces, a region around the first extraction region A1 is referred to as a first circumference region B1. In the two end faces of the multilayer chip 10, a region covering a region to which the second internal electrode layers 40 are extracted is referred to as a second extraction region A2. In the two end faces, the region around the second extraction region A2 is referred to as a second circumference region B2.

Figure 4:
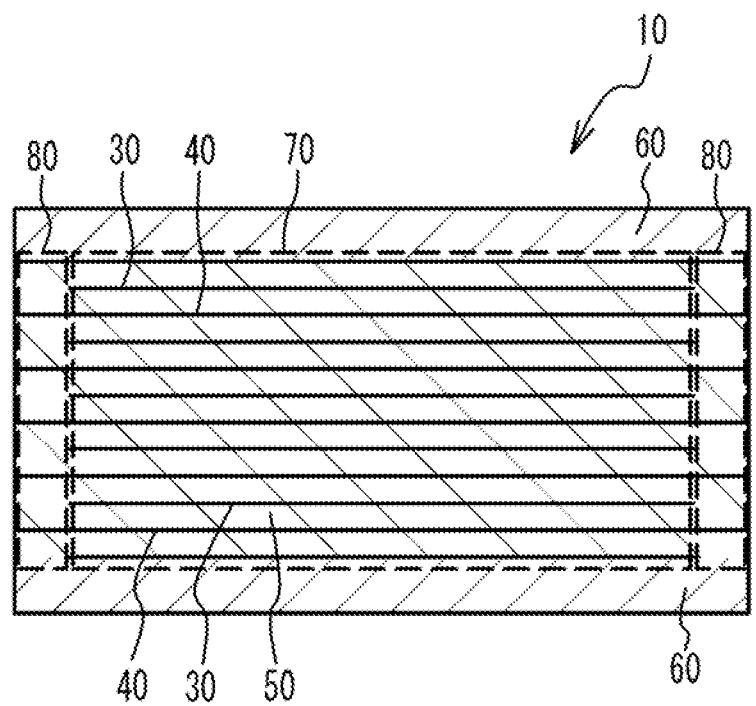
FIG. 4 illustrates a cross sectional view taken along a line A-A of FIG. 3A.

FIG. 4 illustrates a cross sectional view taken along a line A-A of FIG. 3A. As illustrated in FIG. 4, a region in which the first internal electrode layers 30 and the second internal electrode layers 40 face with each other is a region to generate electrical capacity. And so, the region is referred to as a capacity region 70. Near the both end faces of the multilayer chip 10, regions in which the second internal electrode layers 40 face with each other without the first internal electrode layer 30 are referred to as end margin regions 80. The end margin regions 80 are regions not to generate electrical capacity.

Figure 5:
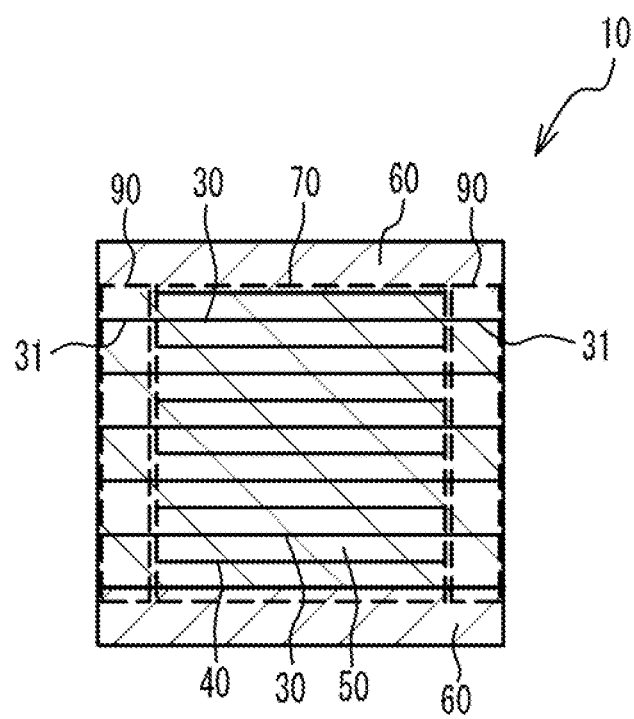
FIG. 5 illustrates a cross sectional view taken along a line B-B of FIG. 3A.

FIG. 5 illustrates a cross sectional view taken along a line B-B of FIG. 3A. As illustrated in FIG. 5, in the multilayer chip 10, a side margin region 90 is a region from the two side faces of the multilayer chip 10 to the second internal electrode layer 40. That is, the side margin region 90 is a region provided so as to cover an end of the second internal electrode layers 40 on the side of the two side faces of the multilayer chip 10. In the side margin region 90, the projection portions 31 of the first internal electrode layers 30 face with each other, but the side margin region 90 does not generate electrical capacity.

Figure 6A:
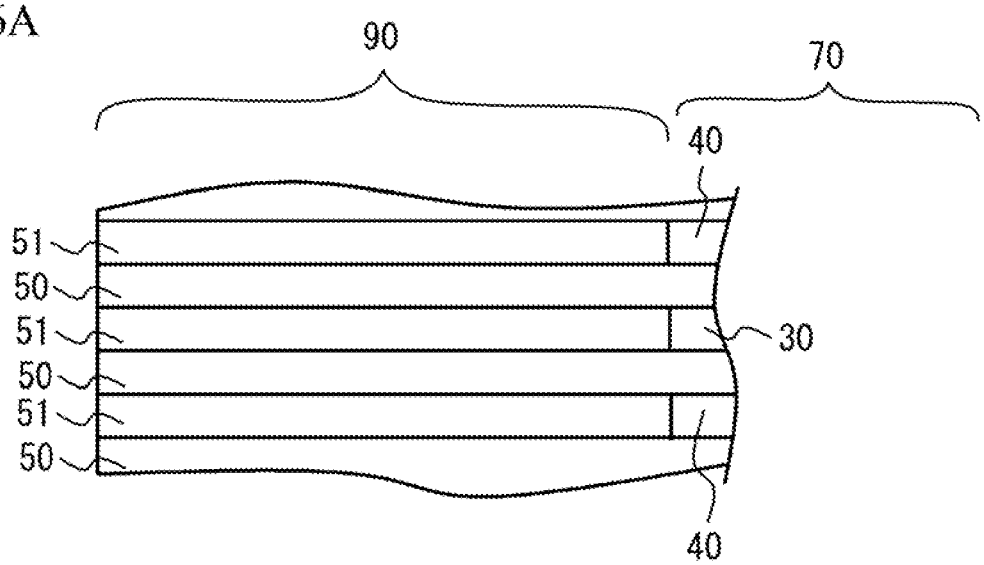
FIG. 6A and FIG. 6B illustrate an enlarged view of a cross section of a side margin region.
Figure 6B:
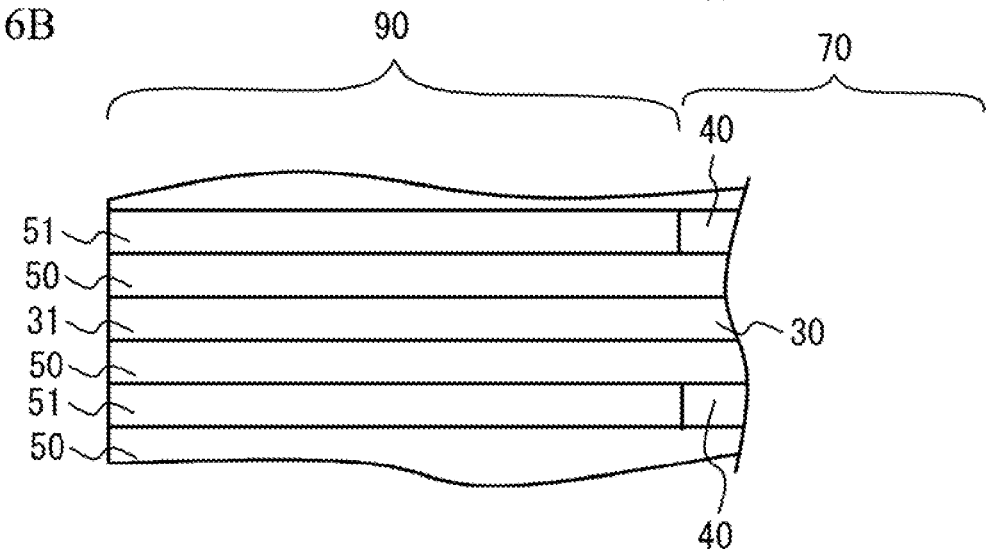
Figure 6C:
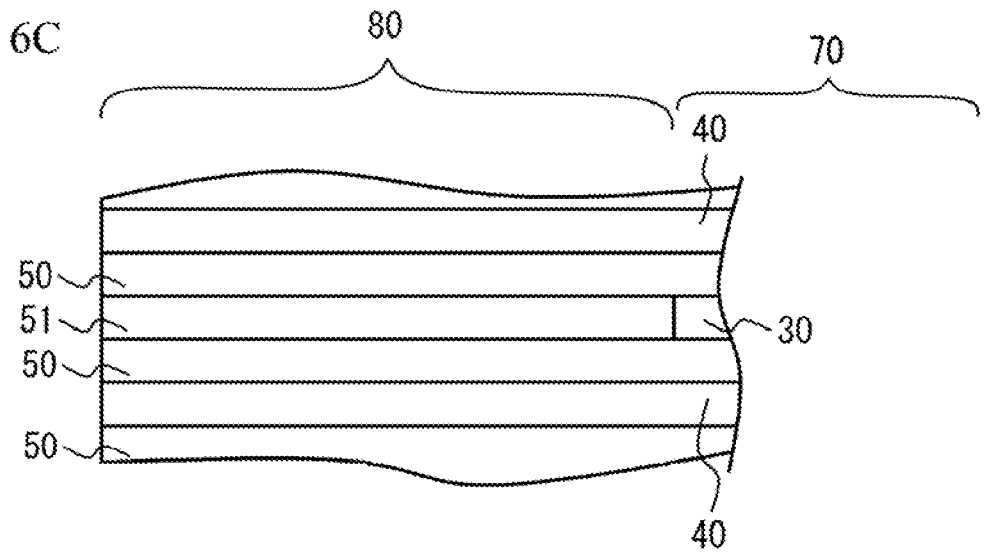
FIG. 6C illustrates an enlarged view of a cross section of an end margin region.

FIG. 6A illustrates an enlarged view of the cross section of the side margin region 90. The side margin region 90 has a structure in which the dielectric layer 50 and a reverse pattern layer 51 are alternately stacked in a stacking direction. Each of the dielectric layers 50 of the capacity region 70 are continuously formed with each of the dielectric layers 50 of the side margin region 90. With the structure, a level difference between the capacity region 70 and the side margin region 90 is suppressed. In FIG. 6B, in the region including the projection portions 31 of the first internal electrode layers 30, stacked sets of the dielectric layer 50, the projection portion 31, the dielectric layer 50 and the reverse pattern layer 51 are repeated in this order. FIG. 6C illustrates an enlarged view of the cross section of the end margin region 80 (in A-A line direction of FIG. 3A). In the end margin region 80, stacked sets of the dielectric layer 50, the reverse pattern layer 51, the dielectric layer 50 and the second internal electrode layer 40 are repeated in this order. With the structure, the level difference between the capacity region 70 and the end margin region 80 is suppressed.

For example, the multilayer ceramic capacitor 100 may have a length of 1.0 mm, a width of 0.5 mm and a height of 0.5 mm. The multilayer ceramic capacitor 100 may have a length of 1.2 mm, a width of 0.9 mm and a height of 0.8 mm. The multilayer ceramic capacitor 100 may have a length of 1.6 mm, a width of 0.8 mm and a height of 0.7 mm. The multilayer ceramic capacitor 100 may have a length of 2.0 mm, a width of 1.25 mm and a height of 1.0 mm. The multilayer ceramic capacitor 100 may have a length of 3.2 mm, a width of 1.6 mm and a height of 1.6 mm. However, the size of the multilayer ceramic capacitor 100 is not limited.

A main component of the first internal electrode layers 30 and the second internal electrode layers 40 is a base metal such as nickel (Ni), copper (Cu), tin (Sn) or the like. The first internal electrode layers 30 and the second internal electrode layer 40 may be made of a noble metal such as platinum (Pt), palladium (Pd), silver (Ag), gold (Au) or alloy thereof. The dielectric layers 50 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure. A main component of the reverse pattern layer 51 and the cover layer 60 is a ceramic material. For example, a main component material of the reverse pattern layer 51 and the cover layer 60 are the same as a main component material of the dielectric layer 50.

Figure 7A:
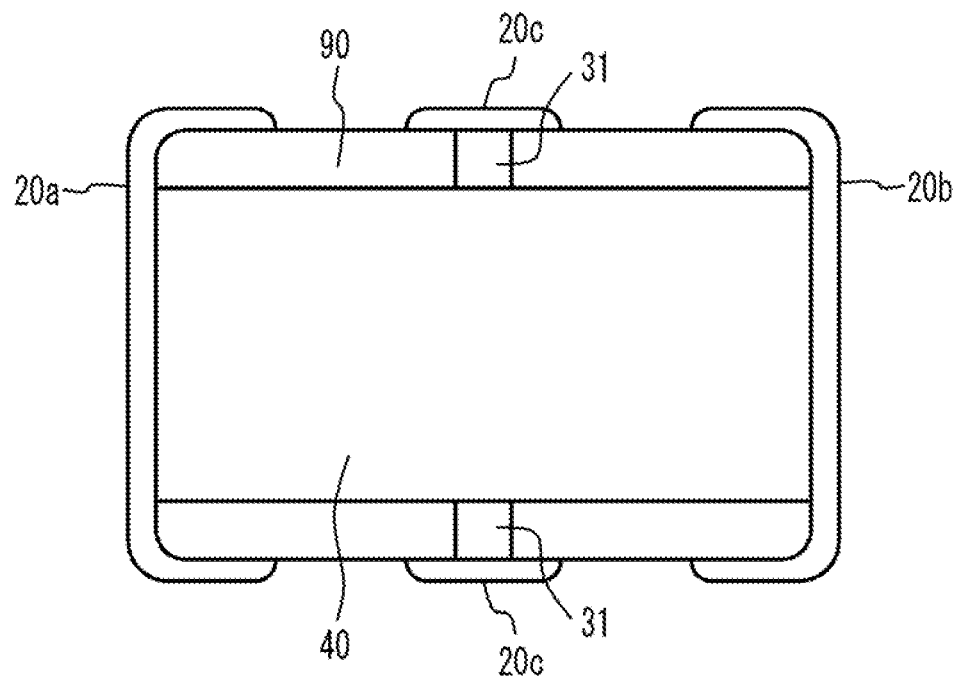
FIG. 7A and FIG. 7B illustrate a multilayer ceramic capacitor that is permeated along a stacking direction.

FIG. 7A illustrates a permeated view of the multilayer ceramic capacitor 100 seen along the stacking direction. A three-terminal type multilayer ceramic capacitor such as the multilayer ceramic capacitor 100 has low ESL characteristic. Therefore, the three-terminal type multilayer ceramic capacitor achieves desirable performance with a small number of elements. Therefore, the three-terminal type multilayer ceramic capacitor can achieve space-saving. Downsizing and capacity enlargement are requested, with respect to the three-terminal type multilayer ceramic capacitor. However, it is difficult to enlarge the capacity region 70 or increase the number of stacking. And so, it is thought that the capacity region 70 is enlarged with use of an excess portion of an external size and the number of stacking is increased, by reducing the thickness of the external electrodes 20a to 20c. However, when the thickness of the external electrodes 20a to 20c is reduced, the humidity resistance may be degraded. For example, during applying of electrical voltage, the humidity resistance may be degraded when $H_2$ diffuses and reaches the capacity region 70 from a connection interface between the internal electrode layer and the external electrode layer.

Figure 7B:
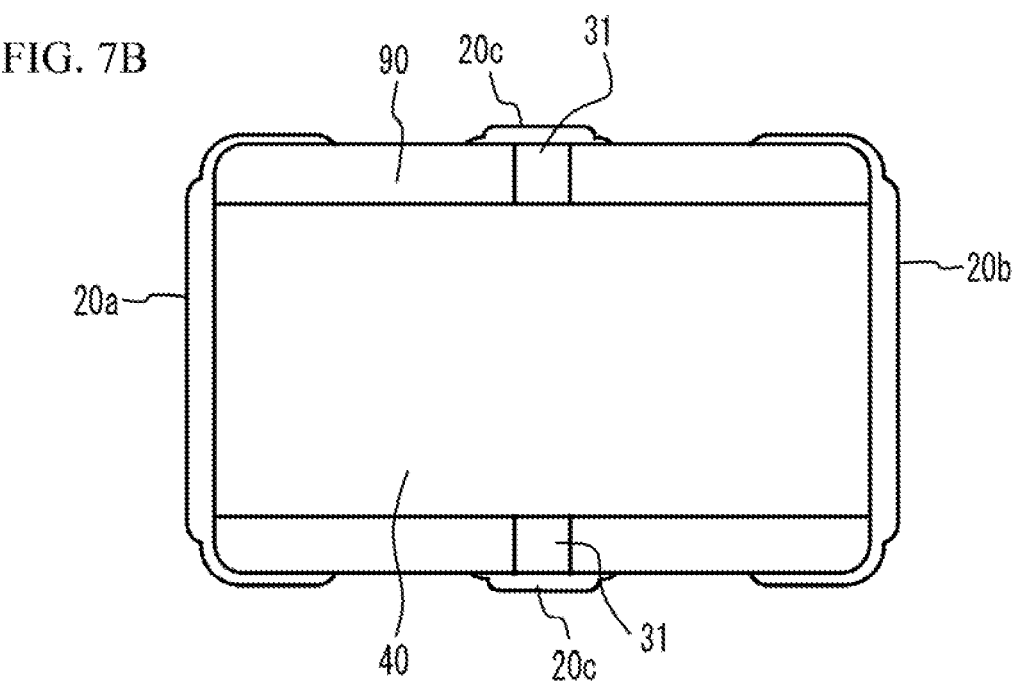

And so, in the embodiment, as illustrated in FIG. 7B, the external electrode 20c has a larger thickness in a region thereof connected to the projection portions 31, and has a smaller thickness in another region thereof. That is, the external electrode 20c has a larger thickness in the first extraction region A1 illustrated in FIG. 3B and has a smaller thickness in the first circumference region B1. Thus, the multilayer ceramic capacitor 100 can secure the humidity resistance and suppress an external size. It is preferable that the external electrodes 20a and 20b have a larger thickness in a region thereof connected to the second internal electrode layer 40 and has a smaller thickness in another region thereof. That is, it is preferable that the external electrodes 20a and 20b have a larger thickness in the second extraction region A2 illustrated in FIG. 3B and has a smaller thickness in the second circumference region B2. In this case, it is possible to secure high humidity resistance of the multilayer ceramic capacitor 100 and suppress the external size of the multilayer ceramic capacitor 100.

Figure 8A:
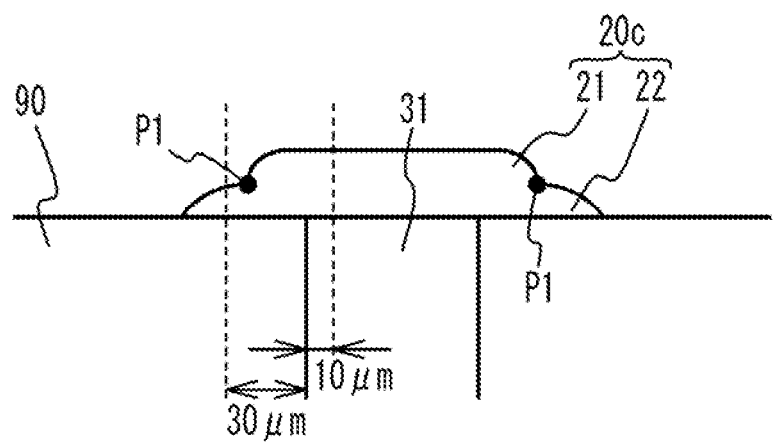
FIG. 8A illustrates an external electrode 20*c*.

As illustrated in FIG. 8A, when the external electrode 20c is seen along the staking direction, the external electrode 20c has a larger thickness portion 21 covering the projection portions 31 and a smaller thickness portion 22 around the larger thickness portion 21, in a direction connecting the two end faces of the multilayer chip 10. A level difference (an inflection point) P1 is provided at an interface between the larger thickness portion 21 and the smaller thickness portion 22. That is, the external electrode 20c has a smaller thickness in the region not connected to the projection portions 31. The external electrode 20c has a level difference at the inflection point P1. And, the thickness of the external electrode 20c gets larger from the inflection point P1. For example, it is preferable that a maximum thickness of the larger thickness portion 21 is 6 μm or more. It is preferable that a maximum thickness of the smaller thickness portion 22 is 3 μm or less. It is preferable that the inflection point P1 is positioned in a range from a point that is 30 μm from the projection portion 31 outward along the longitudinal direction of the first internal electrode layer 30 to a point that is 10 μm inward along the longitudinal direction.

Figure 8B:
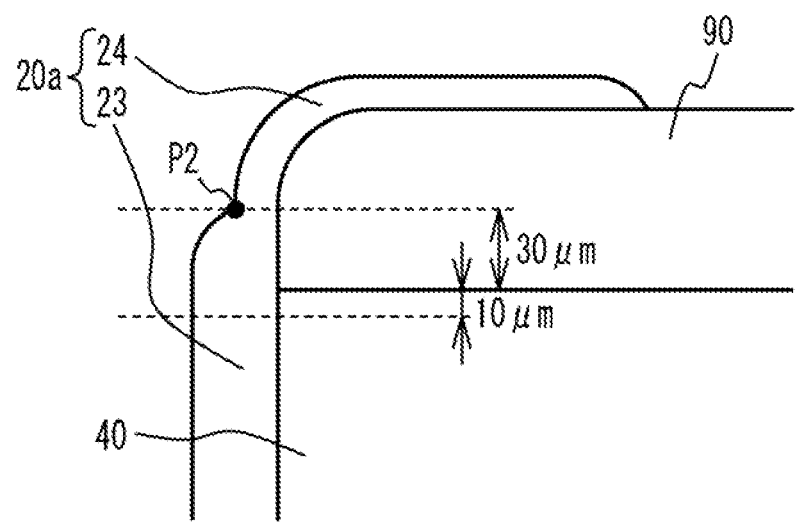
FIG. 8B illustrates an external electrode 20*a*.

As illustrated in FIG. 8B, when the external electrode 20a is seen along the staking direction, it is preferable that the external electrode 20a has a larger thickness portion 23 covering a region to which the second internal electrode layers 40 are exposed and a smaller thickness portion 24 around the larger thickness portion 23, in a direction connecting the two side faces of the multilayer chip 10. A level difference (an inflection point) P2 is provided at an interface between the larger thickness portion 23 and the smaller thickness portion 24. That is, the external electrode 20a has a smaller thickness in the side margin region 90. The external electrode 20a has a level difference at the inflection point P2. And, the thickness of the external electrode 20a gets larger from the inflection point P2. For example, it is preferable that a thickness of the larger thickness portion 23 is 6 μm or more. It is preferable that a thickness of the smaller thickness portion 24 is 3 μm or less. It is preferable that the inflection point P2 is positioned in a range from a point that is 30 μm from the end of the second internal electrode layer 40 on the side face side to a point that is 10 μm toward the opposite side with respect to the side face. It is preferable that the external electrode 20b has the same shape as the external electrode 20a.

A main component of the external electrodes 20a to 20c is a metal such as Cu, Ni, Al (aluminum) or Zn (zinc), or an alloy of two of the metals (for example, an alloy of Cu and Ni). The external electrodes 20a to 20c include ceramic such as glass for densifying the external electrodes 20a to 20c or a co-material for controlling the sintering characteristic of the external electrodes 20a to 20c. The glass component is oxide of Ba (barium), Sr (strontium), Ca (calcium), Zn, Al, Si (silicon), B (boon) or the like. The co-material is a ceramic component of which a main component is the same as the main component of the dielectric layer 50. A main component of the plated layer is a metal such as Cu, Ni, Al, Zn or Sn or an alloy of two of the metals.

Figure 9:
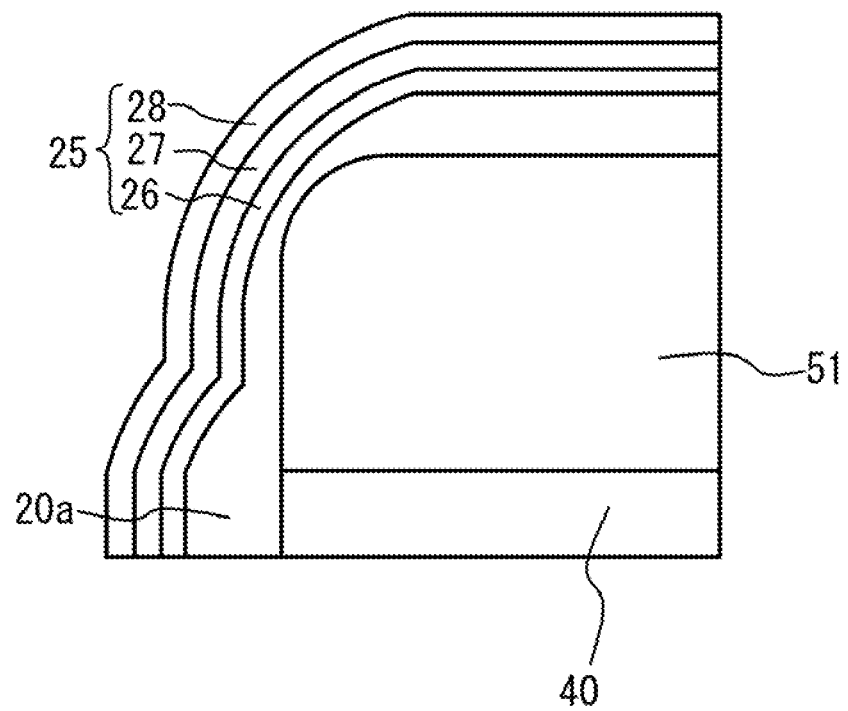
FIG. 9 illustrates a plated layer.

As illustrated in FIG. 9, a plated layer 25 may be provided on a surface of the external electrode 20a. A main component of the plated layer 25 is a metal such as Cu, Ni, Al, Zn, Sn or an alloy of them. The plated layer 25 may be a plated layer of a single metal component or may include a plurality of plated layers having a different metal. For example, the plated layer 25 has a structure in which a first plated layer 26, a second plated layer 27 and a third plated layer 28 are formed from the external electrode 20a side. The first plated layer 26 is, for example, a Cu-plated layer. The second plated layer 27 is, for example, a Ni-plated layer. The third plated layer 28 is, for example, a Sn-plated layer. The external electrodes 20b and 20c have the same structure as the external electrode 20a.

In the multilayer ceramic capacitor 100 of the embodiment, the external electrode 20c has a larger thickness in the region thereof connected to the projection portions 31 and has a smaller thickness around the region thereof. Thus, the multilayer ceramic capacitor 100 can secure the humidity resistance and suppress the external size. At least two positions of the plurality of projection portions 31 may be shifted to each other in the direction connecting the two end faces of the multilayer chip 10 (the longitudinal direction of the multilayer ceramic capacitor 100). For example, the shifted amount may be 100 μm at a maximum, and may be 50 µm or less as an average value. In this case, it is preferable that the external electrode 20c has a larger thickness in the region thereof connected to the projection portions 31 and has a smaller thickness around the region thereof.

Figure 10:
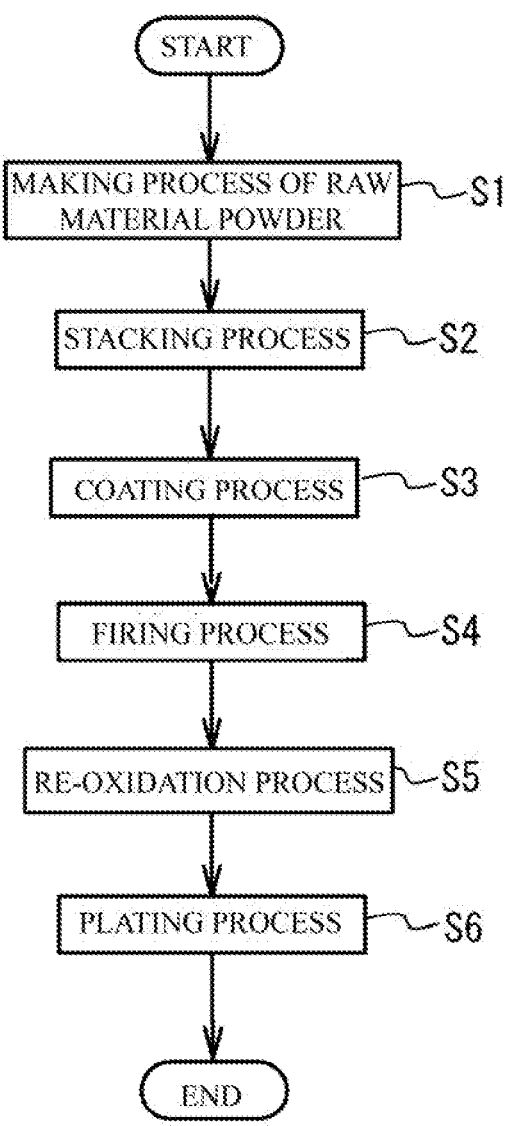
FIG. 10 illustrates a manufacturing method of a multilayer ceramic capacitor.

Next, a description will be given of a manufacturing method of the multilayer ceramic capacitor 100. FIG. 10 illustrates a manufacturing method of the multilayer ceramic capacitor 100.

(Making process of raw material powder) Additive compound may be added to the ceramic material powder that is a main component of the dielectric layer 50 in accordance with purposes. The additive compound may be an oxide of Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni, Li (lithium), B, Na (sodium), K (potassium) and Si (silicon), or glass. The compound including the additive compound is blended with the ceramic material powder and calcined. And, the resulting ceramic material is wet-blended with the additive compound and are dried and crushed. Thus, the ceramic material powder is prepared.

(Stacking process) Next, a binder such as polyvinyl butyral (PVB) resin, an organic solvent such as ethanol or toluene, and a plasticizer are added to the resulting ceramic material and wet-blended. With use of the resulting slurry, a stripe-shaped dielectric green sheet with a thickness of 0.8 µm or less is coated on a base material by, for example, a die coater method or a doctor blade method, and then dried. The dielectric green sheet becomes the dielectric layer 50 in a firing process described later.

Then, a first pattern of the first internal electrode layer 30 and a second pattern of the second internal electrode layer 40 are provided on the surface of the dielectric green sheet by printing conductive paste for forming internal electrodes with use of screen printing or gravure printing. The conductive paste includes powder of the main component metal of the first internal electrode layer 30 and the second internal electrode layer 40, a binder, a solvent, and additive assistants if necessary. The conductive paste may include a ceramic material which is the same as the main component of the dielectric layer 50, as a co-material. Next, a binder such as polyvinyl butyral (PVB) resin, an organic solvent such as ethanol or toluene, and a plasticizer are added to the resulting ceramic material made in the raw material powder making process and wet-blended. The resulting slurry is printed in a reverse pattern with respect to the first pattern and a reverse pattern with respect to the second pattern on the dielectric green sheet, as a first reverse pattern and a second reverse pattern. Thus, a sheet on which the first pattern and the second pattern are formed is formed. The first reverse pattern slurry and the second reverse pattern slurry become the reverse pattern layers 51 in the firing process described later.

Then, the sheet on which the first pattern and the second pattern are printed is stamped into a predetermined size, and a predetermined number (for example, 200 to 500) of stamped sheets are stacked while the base material is peeled so that the first pattern and the second pattern are alternated with each other. Cover sheets, which are to be the cover layers 60, are compressed on the stacked sheets and under the stacked sheets. The resulting stacked structure is cut into a predetermined size (for example, 1.0 mm×0.5 mm). Thus, a ceramic multilayer structure having a rectangular parallelepiped shape is obtained. It is possible to make the cover sheet by adding a binder such as polyvinyl butyral (PVB) resin, an organic solvent such as ethanol or toluene, and a plasticizer to the ceramic material powder made in the raw material powder making process, wet-blending the materials, and printing the resulting slurry.

The inflection point P1 mentioned above and the angle of the level difference are functions determined in accordance with a difference between wettability of the first extraction region A1 and wettability of the first circumference region B1 illustrated in FIG. 3B. The inflection point P2 mentioned above and the angle of the level difference are functions determined in accordance with a difference between wettability of the second extraction region A2 and wettability of the second circumference region B2 illustrated in FIG. 3B. And so, in the ceramic multilayer structure obtained in the stacking process, an amount of the binder may be adjusted in the regions corresponding to the first extraction region A1, the first circumference region B1, the second extraction region A2 and the second circumference region B2. The amount of the binder is a volume % or weight % with respect to the dielectric green sheet, the first reverse pattern slurry, the second reverse pattern slurry or the conductive paste for the internal electrode.

For example, in the face of which an exposed amount of the binder is large, the wettability of conductive paste for the external electrode gets higher. Therefore, in the face of which an exposed amount of the binder is large, the thickness of the conductive paste for the external electrode is reduced. On the other hand, in the face of which an exposed amount of the binder is small, the wettability of the conductive paste for the external electrode gets lower. Therefore, in the face of which an exposed amount of the binder is small, the thickness of the conductive paste for the external electrode is large. And so, the amount of the binder of the first reverse pattern slurry may be larger than the amount of the binder of the conductive paste of the internal electrode. From a view point of the contact angle, in the ceramic multilayer structure obtained in the stacking process, it is preferable that the contact angle of the region corresponding to the first extraction region A1 is larger than the contact angle of the region corresponding to the first circumference region B1, and the difference between the contact angles is more than +15 degrees.

(Coating process) Next, in the ceramic multilayer structure, the conductive paste for the external electrode including a co-material is coated on the regions corresponding to the external electrodes 20a to 20c. In concrete, in the ceramic multilayer structure, the conductive paste for the external electrode is coated so as to cover each of the two end faces to which the second patterns are exposed. Moreover, on each side face of the ceramic multilayer structure, the conductive paste for the external electrode is coated so as to continuously cover the exposed first patterns. It is possible to adjust the thickness of the conductive paste for the external electrode, by diluting the conductive paste for the external electrode.

(Firing process) The binder is removed from the resulting ceramic multilayer structure in $N_2$ atmosphere of a temperature range of 200 degrees C. to 300 degrees C. After that, the resulting ceramic multilayer structure is fired for ten minutes to 2 hours in a reductive atmosphere in a temperature range of 1100 degrees C. to 1300 degrees C. Thus, each compound is sintered. In this manner, it is possible to manufacture the multilayer ceramic capacitor 100 that has the multilayer chip 10 in which the first internal electrode layer 30, the second internal electrode layer 40 and the dielectric layer 50 which are composed of sintered structure are stacked, and the cover layers 60 are provided as outermost layers in the stacking direction.

(Re-oxidizing process) After that, a re-oxidizing process may be performed in $N_2$ gas atmosphere in a temperature range of 600 degrees C. to 1000 degrees C.

(Plating process) After that, the plated layer 25 is formed on the external electrodes 20a to 20c by a wet plating such as an electroplating. For example, the first plater layer 26, the second plated layer 27 and the third plated layer 28 are formed in this order.

In the manufacturing method of the embodiment, the external electrode 20c has a large thickness in the region connected to the first internal electrode layers 30 and has a small thickness in the other region. Thus, the multilayer ceramic capacitor 100 can secure the humidity resistance and suppress the external size. The external electrodes 20a and 20b have a large thickness in the region thereof connected to the second internal electrode layers 40 and has a small thickness around the region. Thus, it is possible to secure the humidity resistance of the multilayer ceramic capacitor 100 and suppress the external size of the multilayer ceramic capacitor 100.

In the manufacturing method of the embodiment, even if the positions of the projection portions 31 are shifted to each other in the direction connecting the two end faces of the multilayer chip 10 (longitudinal direction of the multilayer ceramic capacitor 100), it is possible to enlarge the thickness of the region of the external electrode 20c covering the projection portions 31. A description will be given of the reason.

FIG. 11A illustrates a multilayer structure of a first-pattern-formed sheet 200, a second-pattern-formed sheet 300 and a cover sheet 400. As illustrated in FIG. 11A, the first-pattern-formed sheet 200 has a first pattern 201 to be the first internal electrode layer 30 and a first reverse pattern slurry 202 to be the reverse pattern layer 51. The second-pattern-formed sheet 300 has a second pattern 301 to be the second internal electrode layer 40 and a second reverse pattern slurry 302 to be the reverse pattern layer 51. In FIG. 11A, the dielectric green sheets are omitted.

In the stacking process, there may be a case where positions of the sheets are shifted to each other. In this case, as illustrated in FIG. 11B, there may be fluctuation in positions of the projection portions 31 in the direction connecting the two end faces of the multilayer chip 10 (longitudinal direction of the multilayer ceramic capacitor 100).

FIG. 12A illustrates a case where the conductive paste for the external electrode is coated on the region corresponding to the external electrode 20c. As illustrated in FIG. 12B, in the layer in which the projection portion 31 is not shifted, the projection portion 31 is positioned in a center of the conductive paste for the external electrode. In this case, the conductive paste for the external electrode covering the projection portion 31 has sufficiently large thickness. On the other hand, as illustrated in FIG. 12C, in the layer in which the projection portion 31 is largely shifted, the projection portion 31 is positioned as an end side of the conductive paste for the external electrode. In this case, the thickness of the conductive paste for the external electrode covering the projection portion 31 is not sufficient. Therefore, the thickness of the external electrode 20c covering the projection portion 31 is not sufficient. And, there may be a position of which the humidity resistance is degraded.

On the other hand, FIG. 12D illustrates a case where the conductive paste for the external electrode is coated on the region corresponding to the external electrode 20c. In the embodiment, in the ceramic multilayer structure obtained in the stacking process, the wettability of the conductive paste for the external electrode in the region to which the internal electrodes are exposed is lower than the wettability around the region. Therefore, as illustrated in FIG. 12E and FIG. 12F, in the layer in which the projection portion 31 is largely shifted, the conductive paste for the external electrode covering the projection portion 31 has a sufficient thickness. It is therefore possible to sufficiently enlarge the thickness of the external electrode 20c covering the projection portion 31.

(Modified embodiment) In the above-mentioned manufacturing method, the amount of the exposed binder is adjusted, in order to adjust the wettability of the conductive paste for the external electrode with respect to the region to which the conductive paste for the internal electrode is exposed. However, the method is not limited. For example, the wettability of the conductive paste for the external electrode with respect to the region to which the conductive paste for the internal electrode is exposed may be lowered, by performing a plasma process with respect to the conductive paste for the internal electrode exposed to the two side faces of the ceramic multilayer structure obtained in the stacking process. Alternatively, the wettability of the conductive paste for the external electrode around the region to which the conductive paste of the internal electrode is exposed may be raised, by the plasma process.

Although the embodiments of the present invention have been described in detail, it is to be understood that the various change, substitutions, and alterations could be made hereto without departing from the spirit and scope of the invention.

What is claimed is:

1. A ceramic electronic device comprising:
    a multilayer chip in which dielectric layers of which a main component is ceramic are stacked, the multilayer chip having a rectangular parallelepiped shape and having two end faces facing with each other, an upper face and a lower face in a stacking direction of the dielectric layers, and two side faces that are other than the two end faces, the upper face and the lower face;
    a plurality of first internal electrode layers that are provided inside of the multilayer chip, each of the plurality of first internal electrode layers having projection portions extending to the two side faces; and
    external electrodes that are provided on the two side faces between the two end faces and are connected to the projection portions,
    wherein each of the external electrodes has a smaller thickness in a region not connected to the projection portions on the corresponding side face as measured in a direction perpendicular to the corresponding side face, has an inwardly inflected point as viewed toward the projection portions, and has a larger thickness in a region connected to the projection portions on the corresponding side face as measured in a direction perpendicular to the corresponding side face, in the above order in a direction connecting the two end faces.

2. The ceramic electronic device as claimed in claim 1, further comprising:
    a plurality of second internal electrode layers that are provided inside of the multilayer chip and are extending to the two end faces; and
    a pair of external electrodes that are respectively provided on the two end faces and are connected to the plurality of second internal electrode layers, wherein each of the pair of external electrodes has a smaller thickness in a region not connected to the plurality of second internal electrode layers on the corresponding end face as measured in a direction perpendicular to the corresponding end face, has an inwardly inflected point as viewed toward the plurality of second internal electrode layers, and has a larger thickness in a region connected to the plurality of second internal electrode layers on the corresponding end face as measured in a direction perpendicular to the corresponding end face, in the above order in a direction connecting the two side faces.

3. The ceramic electronic device as claimed in claim 1, wherein, between at least two of the plurality of first internal electrode layers, positions of the projection portions are shifted to each other in the direction connecting the two end faces.

4. A manufacturing method comprising:
preparing a ceramic multilayer structure in which a plurality of pattern-formed sheets are stacked, the plurality of pattern-formed sheets having conductive paste for an internal electrode printed on a dielectric green sheet including ceramic and having a rectangular shape so as to be exposed to a part of two long sides of the dielectric green sheet, and reverse pattern slurry that is printed so as to have a reverse pattern with respect to the conductive paste for the internal electrode and include ceramic, the ceramic multilayer structure having a rectangular parallelepiped shape;
coating conductive paste for an external electrode so as to continuously cover the plurality of pattern-formed sheets having the conductive pastes for the internal electrode that are exposed to two side faces of the ceramic multilayer structure, the two side faces being other than two end faces, an upper face and a lower face of the ceramic multilayer structure, the upper face and the lower face being an upper face and a lower face in a stacking direction of the pattern-formed sheets; and
firing the ceramic multilayer structure and the conductive paste for the external electrode,
wherein wettability of the conductive paste for the external electrode with respect to the reverse pattern slurry is higher than wettability of the conductive paste for the external electrode with respect to the conductive paste for the internal electrode, on the two side faces, before the firing process, to a degree that the external electrode forms an inwardly inflected point as viewed toward the internal electrode by the firing process.

5. The method as claimed in claim 4, wherein an amount of a binder in the reverse pattern slurry is larger than an amount of a binder in the conductive paste for the internal electrode.

6. The ceramic electronic device as claimed in claim 1, wherein
a portion of each of the external electrodes having the smaller thickness is arranged around a portion of each of the external electrodes having the larger thickness.

7. The ceramic electronic device as claimed in claim 1, wherein
a portion of each of the external electrodes having the smaller thickness is formed along each of the two side faces.

8. The ceramic electronic device as claimed in claim 1, wherein
each of the external electrodes includes only a single layer.

9. The ceramic electronic device as claimed in claim 1, wherein
the inwardly inflected point is positioned in a range from a point that is 30 µm from each of the projection portions outward along a longitudinal direction of the first internal electrode layers to a point that is 10 µm inward along the longitudinal direction.

* * * * *